United States Patent
Savtchenko et al.

(10) Patent No.: US 11,760,388 B2
(45) Date of Patent: Sep. 19, 2023

(54) ASSESSING PRESENT INTENTIONS OF AN ACTOR PERCEIVED BY AN AUTONOMOUS VEHICLE

(71) Applicant: Argo AI, LLC, Pittsburgh, PA (US)

(72) Inventors: Constantin Savtchenko, Sewickley, PA (US); Alexander Metz, Bavaria (DE); Andrew T. Hartnett, West Hartford, CT (US); G. Peter K. Carr, Allison Park, PA (US); Greydon Foil, Pittsburgh, PA (US); Lorenzo Nardi, Bavaria (DE)

(73) Assignee: ARGO AI, LLC, Pittsburgh, PA (US)

( * ) Notice: Subject to any disclaimer, the term of this patent is extended or adjusted under 35 U.S.C. 154(b) by 163 days.

(21) Appl. No.: 17/179,503

(22) Filed: Feb. 19, 2021

(65) Prior Publication Data

US 2022/0266873 A1   Aug. 25, 2022

(51) Int. Cl.
*B60W 60/00* (2020.01)
*G06V 20/56* (2022.01)
*G06F 18/214* (2023.01)

(52) U.S. Cl.
CPC .. *B60W 60/00272* (2020.02); *B60W 60/0015* (2020.02); *B60W 60/00274* (2020.02); *G06F 18/2155* (2023.01); *G06V 20/588* (2022.01)

(58) Field of Classification Search
CPC ......... G05D 2201/0213; G05D 1/0253; G05D 1/0077; G05D 1/0289; G05D 1/0011; G05D 1/00; G05D 1/021; G05D 1/0038; G05D 1/0251; G05D 1/0022; G05D 1/0044; G05D 1/0094; G05D 1/0055; G05D 1/0238; G05D 1/027; G05D 1/0217; G05D 1/0027; G05D 1/0061; G05D 1/0248; G05D 2201/0212; G05D 1/0223; G05D 1/0276; G05D 1/024; G05D 1/0278; G05D 1/0231; G05D 1/0257; G05D 1/0274; G05D 1/0221;
(Continued)

(56) References Cited

U.S. PATENT DOCUMENTS 9,428,196 B2    8/2016  Ono
2017/0235848 A1 8/2017  Van Dusen et al.
(Continued)

FOREIGN PATENT DOCUMENTS

WO    2020079074 A2    4/2020

*Primary Examiner* — B M M Hannan
*Assistant Examiner* — Erick T. Detweiler
(74) *Attorney, Agent, or Firm* — FOX ROTHSCHILD, LLP

(57) ABSTRACT

Methods of forecasting intentions of actors that an autonomous vehicle (AV) encounters in are disclosed. The AV uses the intentions to improve its ability to predict trajectories for the actors, and accordingly making decisions about its own trajectories to avoid conflict with the actors. To do this, for any given actor the AV determines a class of the actor and detects an action that the actor is taking. The system uses the class and action to identify candidate intentions of the actor and evaluating a likelihood of each candidate intention. The system repeats this process over multiple cycles to determine overall probabilities for each of the candidate intentions. The AV's motion planning system can use the probabilities to determine likely trajectories of the actor, and accordingly influence the trajectory that the AV will itself follow in the environment.

23 Claims, 9 Drawing Sheets

(58) Field of Classification Search
CPC .. G05D 1/0246; G05D 1/0212; G05D 1/0214; G05D 1/0088; G06V 20/58; G06V 20/56; G06V 10/82; G06V 10/764; G06V 20/588; G06V 20/584; G06V 20/64; G06V 10/25; G06V 20/597; G06V 40/103; G06V 10/255; G06V 40/20; G06V 40/10; G06V 20/52; G06V 20/10; G06V 10/751; G06V 2201/07; G06V 2201/08; G06V 10/40; G06V 20/41; B60W 30/0956; B60W 30/09; B60W 2554/00; B60W 2420/52; B60W 2420/42; B60W 60/0011; B60W 10/20; B60W 50/0097; B60W 50/14; B60W 10/18; B60W 60/001; B60W 2556/50; B60W 60/0027; B60W 60/0015; B60W 30/095; B60W 30/0953; B60W 2554/4041; B60W 30/18163; B60W 2520/10; B60W 2554/80; B60W 10/04; B60W 2556/45; B60W 2555/60; B60W 30/18154; B60W 2710/18; B60W 2710/20; B60W 60/00274; B60W 2050/146; B60W 30/16; B60W 30/00; B60W 2554/4029; B60W 40/04; B60W 30/08; B60W 40/06; B60W 60/00276; B60W 2720/10; B60W 2556/10; B60W 60/00272; B60W 2554/4045; B60W 2554/402; B60W 2554/4042; B60W 2050/0075; B60W 10/06; B60W 2555/20; B60W 50/00; B60W 2556/65; B60W 2552/53; B60W 2050/143; B60W 2554/801; B60W 2720/106; B60W 50/0098; B60W 40/08; B60W 2554/804; B60W 2552/00; B60W 2554/4044; B60W 30/18159; B60W 2554/20; B60W 60/0017; B60W 60/0016; B60W 30/02; B60W 30/10; B60W 2520/105; B60W 40/02; B60W 50/06; B60W 40/09; G06F 18/2155

See application file for complete search history.

(56) References Cited

U.S. PATENT DOCUMENTS

| | | | |
|---|---|---|---|
| 2018/0143644 A1* | 5/2018 | Li | B60W 30/18154 |
| 2019/0367020 A1 | 12/2019 | Yan et al. | |
| 2020/0023838 A1* | 1/2020 | Zhang | B60W 30/0953 |
| 2020/0207369 A1 | 7/2020 | Mehta et al. | |
| 2020/0249674 A1* | 8/2020 | Dally | G05D 1/0088 |
| 2021/0009121 A1* | 1/2021 | Oboril | B60W 50/0097 |
| 2021/0107476 A1 | 4/2021 | Cui | |
| 2021/0163013 A1* | 6/2021 | Ueno | B60W 40/04 |

* cited by examiner

ASSESSING PRESENT INTENTIONS OF AN ACTOR PERCEIVED BY AN AUTONOMOUS VEHICLE

BACKGROUND

As an autonomous vehicle (AV) moves about an environment, it will detect many actors that are moving, or which may move, within or near the AV's planned path of travel. To operate safely the AV will forecast what the actor will do so that the AV can pre-emptively avoid conflict with the actor.

Forecasting what an actor will do involves several steps. Often an AV will make several forecasts and rank, score or assign a probability to each forecast. Forecasting can be a computationally intensive process, using up processing time, stored energy, and other resources of the AV. Therefore, methods and system that can improve the process by which an AV forecasts what another actor may do can be very useful.

This document describes methods and systems that are directed to addressing the problems described above, and/or other issues.

SUMMARY

Various embodiments described in this document include a method of forecasting an intention of an actor who is located in an environment through which an autonomous vehicle (AV) is traveling. In this method, a perception system of the AV detects an actor that is proximate to the AV, determines a class of the actor, and detects an action that the actor is taking. A forecasting system of the AV will, for each cycle of various cycles: (i) use the class and the detected action to generate a plurality of candidate intentions of the actor; (ii) evaluate a likelihood of each candidate intention; and (iii) save each of the candidate intentions and their likelihoods in a data store. After any cycle has completed, the forecasting system will analyze the candidate intentions and their likelihoods for the current cycle and for one or more prior cycles to determine an overall probability for each of the candidate intentions. A motion planning system of the AV will then use the overall probabilities to select one of the candidate intentions to influence a selected trajectory for the AV.

In various embodiments, using the class and the detected action to generate a plurality of candidate intentions of the actor may include: (i) accessing a data set of possible goals that are associated with various classes of actors; (ii) selecting possible goals that the data set associates for with the detected class of the actor; (iii) determining which of the possible goals in the data set are consistent with the detected action; and (iv) using the determined possible goals as the candidate intentions. Determining which of the possible goals in the data set are consistent with the detected action (i.e., step (iii)) may include determining whether the detected action satisfies one or more rules of each of the possible goals, or processing the detected actions and possible goals in a machine learning model that has been trained on a data set of labeled actions and goals.

In various embodiments, evaluating the likelihood of each candidate intention may include tracking each candidate intention with a unique probabilistic model per candidate intention, in which [false, true] states of each probabilistic model represent whether the candidate intention corresponds to detected action.

Optionally, after an additional group of cycles have been completed, wherein the additional group comprises at least some of the cycles considered when determining the overall probabilities plus one or more additional cycles, the forecasting system may analyze the candidate intentions and their likelihoods for the additional group of cycles to refine the overall probabilities for each of the candidate intentions.

Optionally, for at least some of the candidate intentions, the forecasting system may forecast a future modality of the actor and assign a probability to each forecasted future modality. If so, then when one or more of the candidate intentions and their likelihoods to influence the selected trajectory for the AV, the system may select a trajectory that is consistent with one or more of the forecasted future modalities having a probability that exceeds a threshold. Optionally, before forecasting the future modalities of the actor and assigning probabilities to the forecasted future modalities, the system may eliminate candidate intentions having likelihoods that are below a threshold, so that forecasting the future modalities of the actor is only performed for candidate intentions having relatively high likelihoods.

In various embodiments, determining the overall probabilities for each of the candidate intentions may include assigning a relatively higher likelihood to any candidate intention that persisted over a non-interrupted sequence of cycles, and assigning a relatively lower likelihood to any candidate intention that did not persist over a non-interrupted sequence of cycles.

In various embodiments, determining the overall probabilities for each of the candidate intentions may include: (i) evaluating each of the candidate intentions against a kinematic state of the actor; (ii) assigning a relatively higher likelihood to any candidate intention that is consistent with the kinematic state of the actor; and (iii) assigning a relatively lower likelihood to any candidate intention that is not consistent with the kinematic state of the actor.

In various embodiments, determining the overall probabilities for the candidate intentions may include: (i) receiving, from various sensors of the perception system, environmental data relating to the environment through which the autonomous vehicle is traveling; (ii) applying the environmental data to a random forest classifier to classify an environmental condition of the environment; (iii) assigning a relatively higher likelihood to any candidate intention that is consistent with the environmental condition; and (iv) assigning a relatively lower likelihood to any candidate intention that is not consistent with the environmental condition.

In various embodiments, determining the overall probabilities for the candidate intentions may include: (i) identifying a first goal of the candidate intentions and a second goal of the candidate intentions, wherein the first goal conflicts with the second goal; and (ii) determining that the detected actions of the actor over multiple cycles were consistent with the first goal, and in response reducing the overall probability of the candidate intention that is the second goal.

Any of the methods described above may be implemented by an AV having a perception system, a forecasting system and a motion planning system. The perception system may include one or more sensors for capturing perception data about actors that are proximate to the autonomous vehicle. The perception system also may include a processor and a memory with programming instructions that are configured to instruct the processor of the perception system to process the perception data as described above. The forecasting system also may include a processor and a memory with programming instructions that are configured to instruct the processor of the forecasting system to implement the steps that attributed to the forecasting system described above and below. The motion planning system also may include a processor and a memory with programming instructions configured to cause the processor of the motion planning system to use the overall probabilities to select one of the candidate intentions to influence a selected trajectory for the autonomous vehicle.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle (AV) must be able to predict the future trajectories of actors that it detects in its environment in order to make safe and efficient behavior decisions. A "reference path" is a trajectory through 2D space described by a polyline, which may include a sequence of waypoints that the agent would follow. After understanding the intent or goal of an actor, the AV will determine an ideal reference path and/or multiple candidate reference paths from the actor's current location toward that goal.

Before determining the actor's reference path or candidate paths, the AV must determine an intent of the actor—that is, what is the actor's high-level plan, regardless of how the actor may execute that plan. The root of all forecasting begins at inferring the actor's likely intentions and store them as a set of possible intentions. Example intentions (which we may also refer to as intents or goals) include "cross the street" (if a pedestrian), "park" or "turn right" (if a vehicle), or any other number of possible high-level actions that a moving actor may take on or near a road.

Current approaches for inferring intent focus on an actor's plan as a set of discrete steps or states.

This document describes improved methods of inferring an actor's intent by making proposals at multiple levels, such as semantic and spatial levels.

Figure 1:
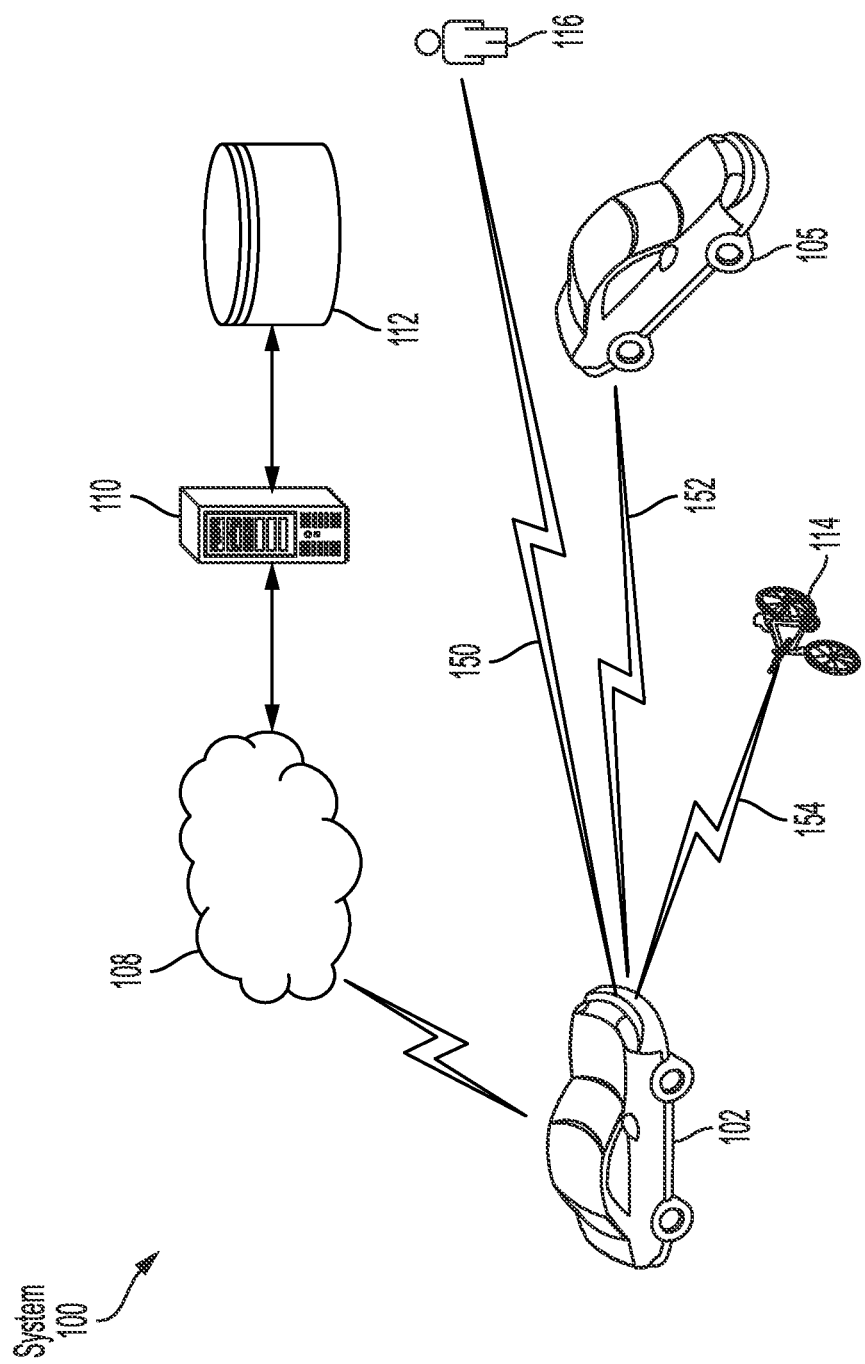
FIG. 1 illustrates how an autonomous vehicle may perceive various other actors in an environment in which the vehicle is moving or will move.

Before discussing the current approaches, it is useful to describe how an AV may perceive an actor in an environment. FIG. 1 illustrates a example system 100 that includes a vehicle 102 that is traveling along a road in a semi-autonomous or autonomous manner. Vehicle 102 may be an AV. The AV 102 can be, but is not limited to, a land vehicle (as shown in FIG. 1), an aircraft, or a watercraft.

AV 102 is generally configured to detect other objects such as actors 105, 114, 116 within the range and field of detection of its sensors. The actors can include, for example, another vehicle 105, a cyclist 114 (such as a rider of a bicycle, electric scooter, motorcycle, or the like) and/or a pedestrian 116. This object detection can be made, for example, by analyzing sensor data generated by at least one sensor device on the AV 102 and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle and any entity that may affect, or may be affected by, the vehicle.

When such a detection is made, AV 102 performs operations to: generate one or more possible actor trajectories (or predicted paths of travel) for the detected actor; and use at least one of the generated possible object trajectories (or predicted paths of travel) to facilitate a determination of a vehicle trajectory for the AV. The AV 102 may then perform operations to follow the vehicle trajectory.

In some scenarios, the AV $102_1$ performs additional operations to determine whether or not there is an undesirable level of risk that the AV will come within a threshold distance from the actor in a threshold period of time (e.g., 1 minute). If so, the AV 102 performs operations to determine whether that situation can be avoided if the vehicle trajectory is followed by the AV 102 and any one of multiple dynamically generated emergency maneuvers is performed in pre-defined time period (e.g., N milliseconds). If the situation can be avoided, then the AV 102 takes no action or optionally performs a cautious maneuver (e.g., mildly slows down). In contrast, if the situation cannot be avoided, then the AV 102 immediately takes an emergency maneuver (e.g., brakes and/or changes direction of travel).

In some embodiments, the AV may include or be in communication with a data store having a set of goals that may be assigned to various classes of actors. For example, the data set may include data indicating that a vehicle class of actor may be associated with goals that include: (i) lane following (i.e., an intention to follow mapped lanes in the environment); (ii) an unmapped maneuver (such as k-turns, illegal U-turns, or turning into a parking garage); (iii) parked or parking; and/or (iv) lane blocking (such as by double-parking or otherwise stopping in and at least partially obstructing a lane). The data set may indicate that a pedestrian class of actor may be associated with goals such as crossing a street at a crosswalk, jaywalking, entering a packed vehicle, or other goals.

Figure 2:
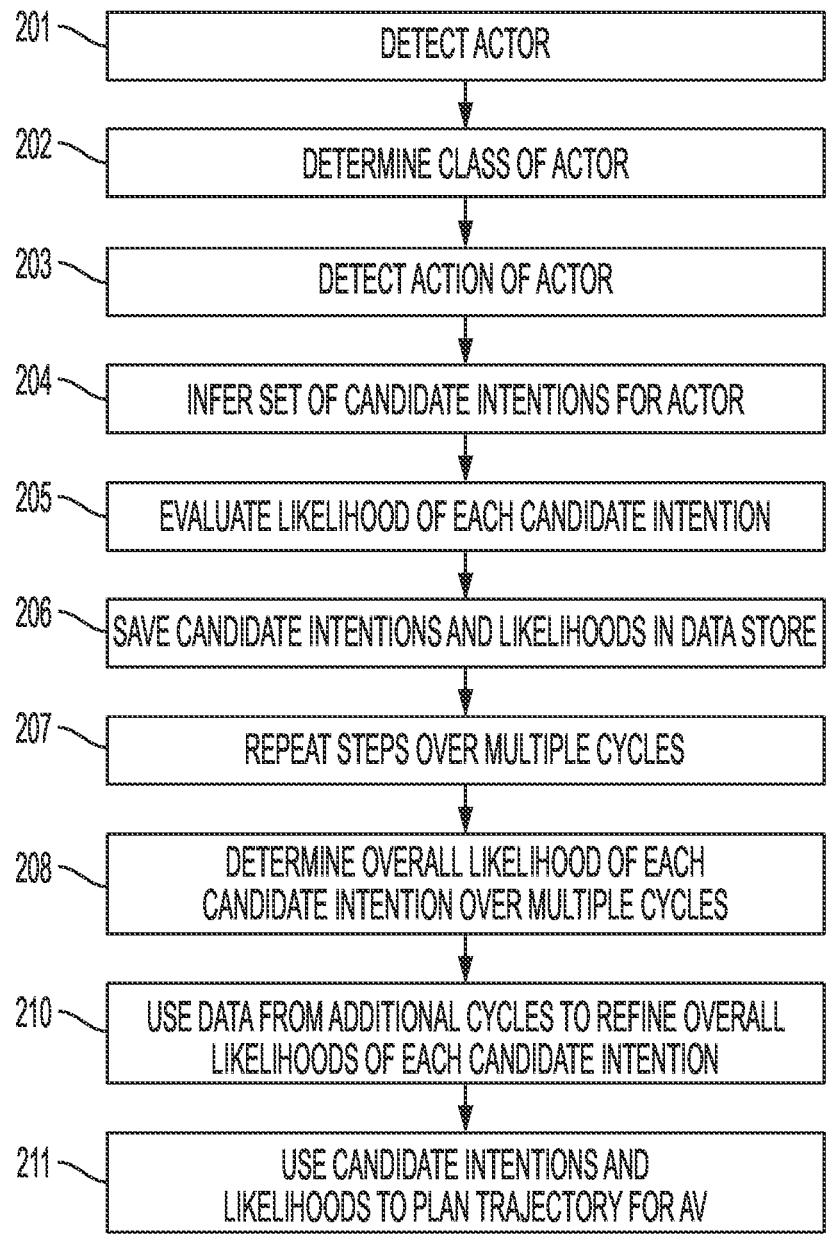
FIG. 2 is a flow diagram illustrating a process by which a vehicle may infer an intent of a perceived actor.
Figure 4:
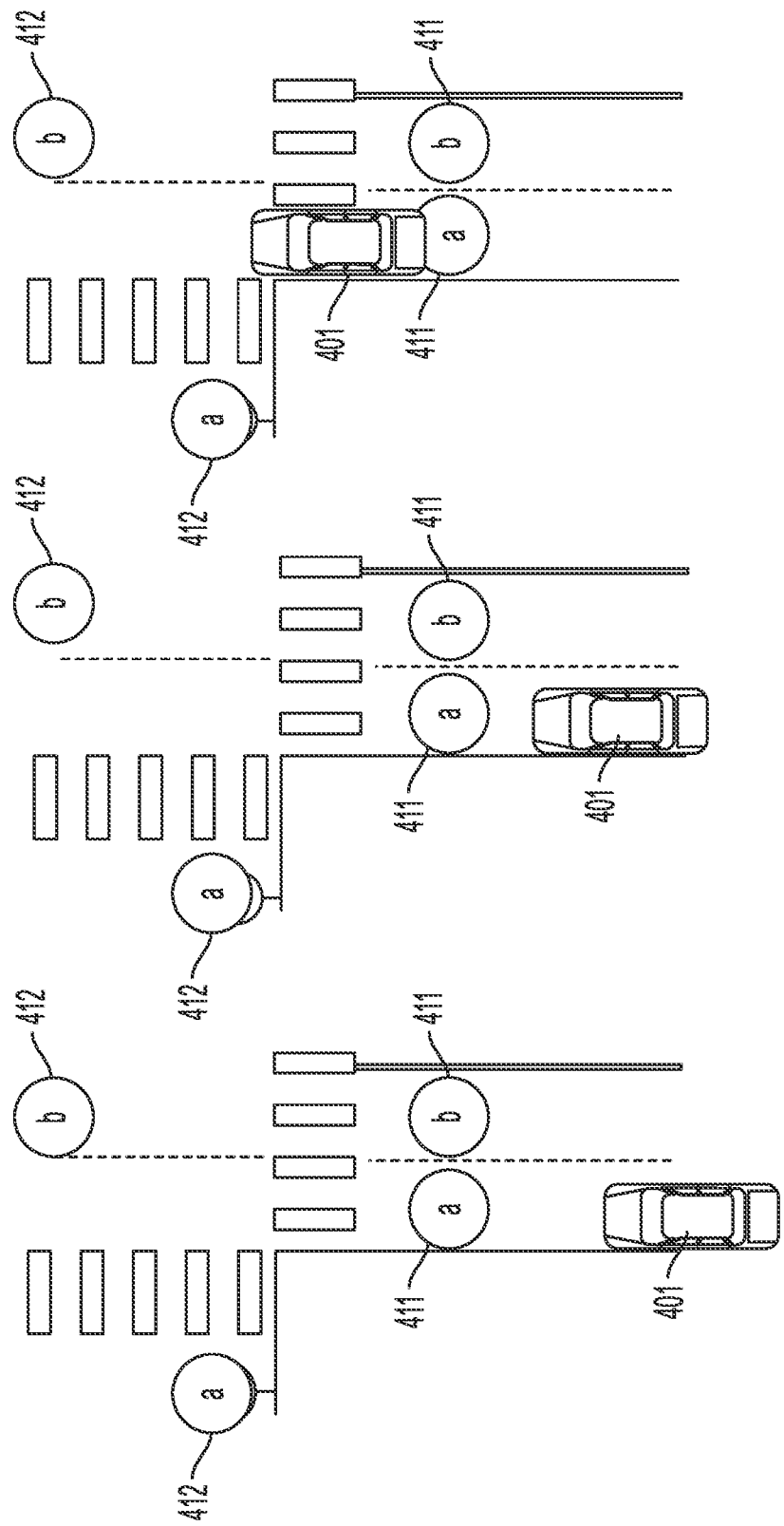
FIGS. 4A-4C illustrate an example process of inferring candidate intents of an actor and updating the likelihoods of each intent over time.

FIG. 2 illustrates a process by which an AV may infer an intent of an actor that the AV perceives in an environment in which the vehicle is traveling. At 201 the AV's perception system will detect an actor that is proximate to the AV (i.e., within detection range of the AV's camera, LIDAR system, and/or other sensors). The AV's on-board computing system, acting as part of the perception system, will process the sensed data to determine a class (i.e., a categorical label such as car, pedestrian, bicycle, etc.) of the actor at 202. At 203 the AV will detect an action that the actor is taking, such as walking toward the AV, facing the street, or operating a turn signal. Methods by which a perception system may perform these steps will be described in the discussion of FIG. 4 below.

At 204 a forecasting system of the AV will infer a set of one or more candidate intentions of the actor for each cycle over multiple cycles, in which a cycle represents a time period over which the actor was sensed via the perception system. To do this, the system will use the class and the detected actions to generate the candidate intentions of the actor. An example process by which the system may do this by accessing a data set of possible goals that are associated with various classes of actors, select possible goals that the data set associates with the detected class of the actor, and determining which of the possible goals in the data set are consistent with the detected action that the actor is taking. This determination of consistency may be done at a semantic level (example: a pedestrian actor who is both walking and facing the street may have a goal of walking across the street), or based on one or more rules (example: a goal may require certain actions to be taken, and actions that are required by the goal will be consistent with the goal). In addition or alternatively, the determination of consistency may include processing the actions in a model such as convolutional neural network that has been trained on a data set of labeled actions and goals. The system will then select, as the set of candidate intentions, the possible goals that are consistent with the detected action.

Figure 3:
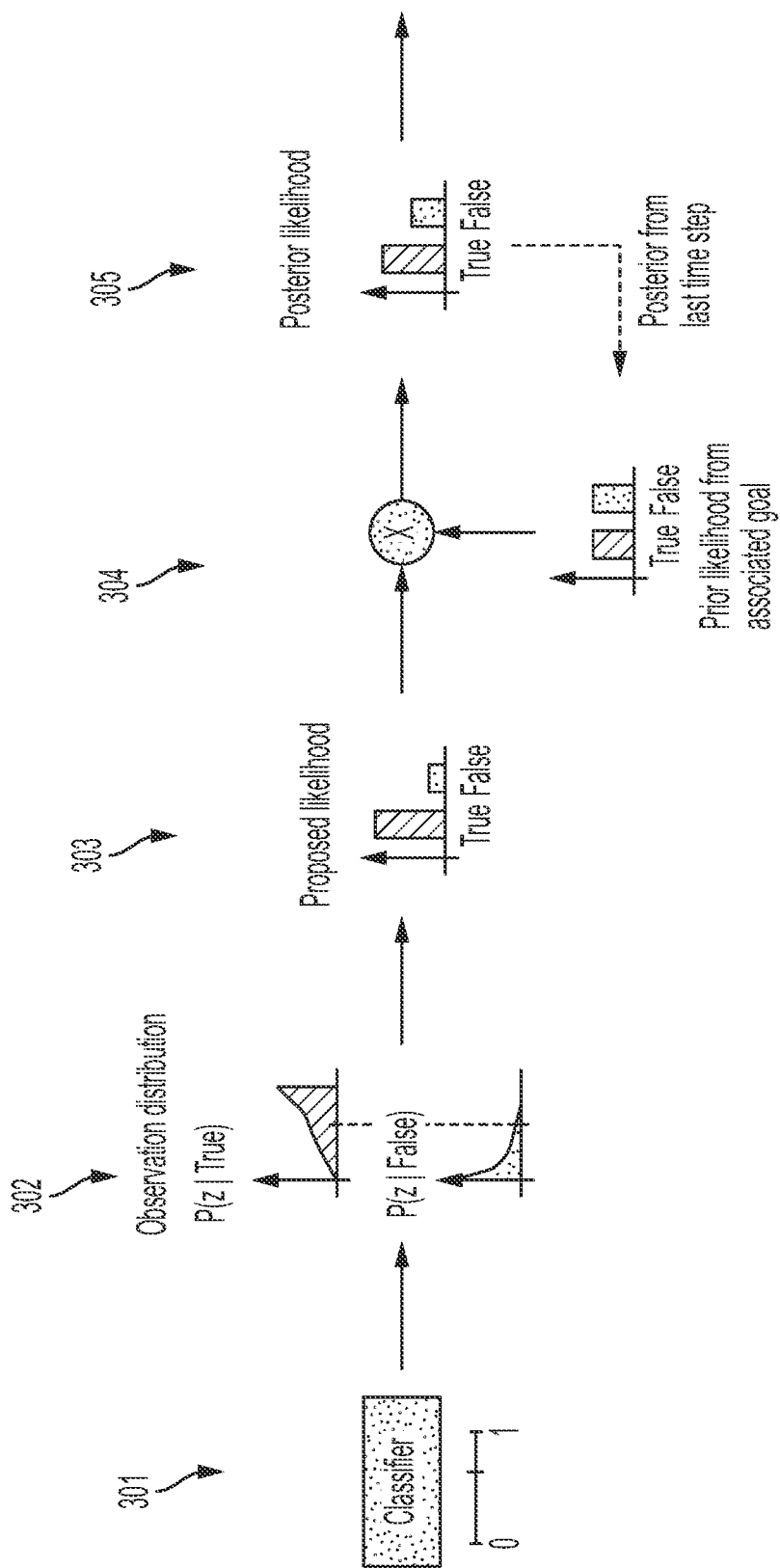
FIG. 3 illustrates an example algorithm for determining likelihoods of a goal over multiple cycles using observed evidence and a Bayes filter.

At 205 the system may evaluate a likelihood of each candidate intention in the set. To do this the system may consider factors such as the progressing of the actor towards a common goal over multiple consecutive cycles, feasibility of the dynamics required to achieve the goal, goals of other actors detected in the scene, or other factors. The system may determine likelihoods of any particular goals by, for example, tracking each goal with a binary hidden Markov model (HMM), uniquely assigned with one per goal, in which the [false, true] states of each HMM represent whether the goal correctly describes the behavior of the mover. As shown in FIG. 3, inputs to the HMM can be outputs from a machine learning model such as a classifier 301 which infers a hidden state or other embedding representation of the actor, heuristic results of observations of the actor's state, or outputs from one or more rule-based processes. Using labels for the ground truth state of the HMM, a distribution of the input 302 can be fitted for each state of the HMM. Each of these outputs will be observed over multiple cycles at 302, and where multiple sources of evidence are available they may be combined to yield a proposed likelihood of each goal 303. Although use of the HMM is described by way of example, this disclosure is not limited to that probabilistic model, and other models that reason over a discrete state space such as Conditional Random Fields, hierarchical and/or multiresolution HMIs, or neural networks.

A Bayes filter 304 may then calculate a posterior likelihood 305 out of the current proposed likelihood and the prior likelihoods, using a function such as:

$$P_{posterior}(x_t) = \eta \cdot \Pi_i P(z_i|x_t) \cdot P_{prior}(x_t),$$

in which:

$\Pi_i P(z_i|x_t)$, is the observation likelihood for observation $z_i$ conditioned on state x at time t, $\eta$ is a normalization constant, and $P_{prior}(x_t)$ is the predicted belief of state x after applying the transition probabilities.

To use an observation as source of evidence in the algorithm of FIG. 3, a likelihood must be extracted from that evidence at 303. This may be done by mapping the observation to a likelihood. At 302 the observation distribution may be statistically accumulated using a probability density function for observed values in real data such as recorded observations of actor state as captured by a fleet of AVs, conditioned on the ground truth of the goal. P(z|groundtruth) may represent the probability of observing each possible value of z given that the actor adhered to the goal. The concrete values of each observation $z_i$ may be looked up in the observation distribution to obtain its conditional likelihood $P(z_i|x_t)$.

At 304 posterior likelihoods from a previous cycle may be carried into a current cycle using transition probabilities. This is because behavior of actors may change over time. This may be handled by an equation such as:

$$P_{prior}(x_t) = \Sigma P(x_t|x_{t-1}) P_{posterior}(x_{t-1})$$

in which $(x_t|x_{t-1})$ is the transition probability density for a belief from the previous cycle to the current cycle. This may be generated by statistically accumulating transitions of the ground truth of the goal in real data.

By way of example, one possible goal, such as a nominal lane goal (that is, a goal of the actor proceeding in a nominal lane) may be inhibited by (i.e., conflict with or be inconsistent with) another goal (such as a "parked" goal). If the actor appears to be parked over multiple cycles, the likelihood of the actor having the nominal lane goal may decrease as those cycles increase. For example, as the actor is observed over multiple cycles, for each cycle the system may determine a proposed likelihood of the "nominal lane" goal by looking up the output of the nominal lane classifier in the observation distribution and normalizing it via a function such as:

$$P_{proposed}(NL_t) = \eta \cdot P(\text{nominal lane classifier output}|NL=\text{true}),$$

in which $$\eta = \frac{1}{(P(\text{classifier output}|NL=\text{true}) + P(\text{classifier output}|NL=\text{false})}.$$

The step described above is optional if the classifier is assumed to output calibrated probabilities.

The system may calculate a prior goal likelihood by predicting the posterior likelihood from the last cycle into the current cycle, using a function such as.

$$P_{prior}(NL_t) = \Sigma P(NL_t|NL_{t-1}) P_{posterior}(NL_{t-1}),$$

in which $P(NL_t|NL_{t-1})$ is a 2×2 transition probability matrix describing the probability of transitioning between all combinations of NL=false and NL=true.

The system may calculate a likelihood from the inhibitory effect of detecting behavior indicative of an alternate goal (such as Parked) in the current cycle by looking up the output of the Parked goal (or the output of an is_parked classifier) in the observation distribution and normalizing it.

$$P(P_{inhibitory}) = \eta \cdot P(\text{is parked classifier output}|NL=\text{true}).$$

The posterior goal likelihood may then be calculated and normalized as:

$$P_{posterior}(NL_t) = \eta \cdot P_{proposed}(NL_t) \cdot P_{prior}(NL_t) \cdot P(P_{inhibitory})$$

Returning to FIG. 2, at 206 the system may save each of the candidate intentions and their likelihoods in a data store.

As noted above, the system may receive data over multiple cycles, so step 207 indicates that the system may repeat any or all of steps 201-206 (or only steps 203-206) over multiple cycles. After any cycle has completed, at 208 the system may analyze the candidate intentions and their likelihoods for the current cycle and one or more prior cycles to determine an overall probability (i.e., a probability over multiple cycles) for each of the candidate intentions. To do this, the system may use any suitable criteria. For example, the system may assign a relatively higher likelihood to any candidate intention that persisted over a non-interrupted sequence of cycles, and it may assign a relatively lower likelihood to any candidate intention that persisted over a non-interrupted sequence of cycles. In addition or alternatively, the system may evaluate each of the candidate intentions against a kinematic state of the actor (as determined by the perception system), assign a relatively higher likelihood to any candidate intention that is consistent with the kinematic state of the actor; and assign a relatively lower likelihood to any candidate intention that is not consistent with the kinematic state of the actor. (Consistency in this instance also may be determined in any of the manners described above.) These factors may be weighted and summed or used in any other suitable formula to determine the relative probabilities. In addition, if a goal cannot plausibly be achieved by the actor, or if its likelihood is below a threshold level, it may be eliminated from consideration. For example, if a goal is geometrically impossible or infeasible in view of the vehicle's kinematic state, it may be eliminated.

Optionally, at 210 the system may use the data from additional cycles to refine the overall likelihoods of each candidate intention. For example, FIGS. 4A-4C illustrate progression of an actor 401 toward various goals over multiple cycles in time. In FIG. 4A, at time t0 the actor 401 is approaching candidate lane following goals 411a and 411b. Initially, the system may determine that goal 411a is more likely than 411b because the vehicle is currently in the lane of goal 411a. In FIG. 4B, at time t1 the actor 401 continues in the same lane goal 411a, has not signaled an intent to switch lanes, and is in a position where the dynamics of changing lanes to reach goal 411b would be result in a sudden, harsh movement. In view of any or all of these factors, the system will increase the value of the likelihood of goal 411a and correspondingly decrease the likelihood of goal 411b. In FIG. 4C at time t2 the vehicle has reached the end of the lane corresponding to goal 411a so the system then considers a next set of goals, which may include a left turn goal 412a and/or a parking goal 412b. In addition, FIGS. 4A and 4B shows that the consider may consider relative likelihoods of multiple goal sets 411a-b and 412a-b and consider the relative likelihoods of each goal within the set before the actor 401 completes any of the goals within one of the set or makes movements that render goals in a set to be impossible.

Returning to FIG. 2, at 211 a motion planning system of the autonomous vehicle will use one or more of the candidate intentions and their likelihoods to influence a selected trajectory for the autonomous vehicle. For example, as described above, the AV may avoid or alter a planned path that is likely to conflict with a trajectory of the actor that is associated with a goal having a likelihood that exceeds a threshold. Optionally, if the vehicle is equipped with an on-board display device, the goals for that actor that have a likelihood that exceeds a threshold, or the most likely goals for the actor, may be output on the display for viewing by a vehicle operator.

Figure 5:
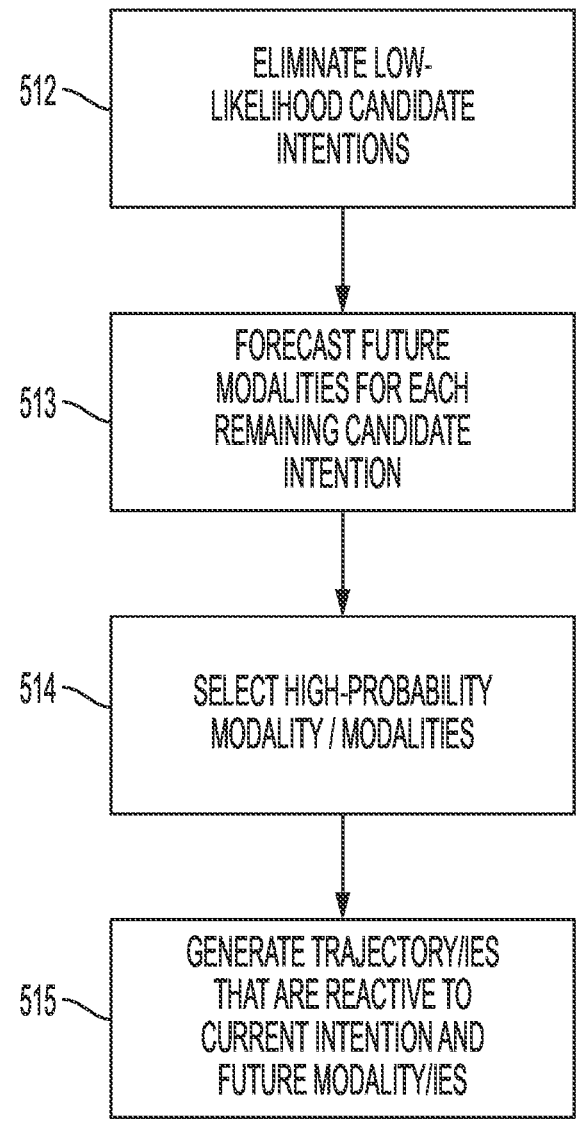
FIG. 5 illustrates additional detail about certain steps of the process of FIG. 2.

FIG. 5 illustrates another example of how the AV's motion planning system may use one or more of the candidate intentions and their likelihoods to influence a selected trajectory for the autonomous vehicle (step 211). At 512, the system may first filter out candidate intentions having likelihoods that are below a threshold, so that the next step is only performed for candidate intentions having relatively high likelihoods. At 513, for at least some of the candidate intentions, the forecasting system will forecast a future modality (i.e., a subsequent goal that the actor may have after reaching the current goal) and assign a probability to each forecasted future modality. At 514 the forecasting system may select a relatively high probability future modality, at 515 the system may select a trajectory that is consistent with both the current inferred intent and more of the forecasted modalities having a probability that exceeds a threshold.

Figure 6A:
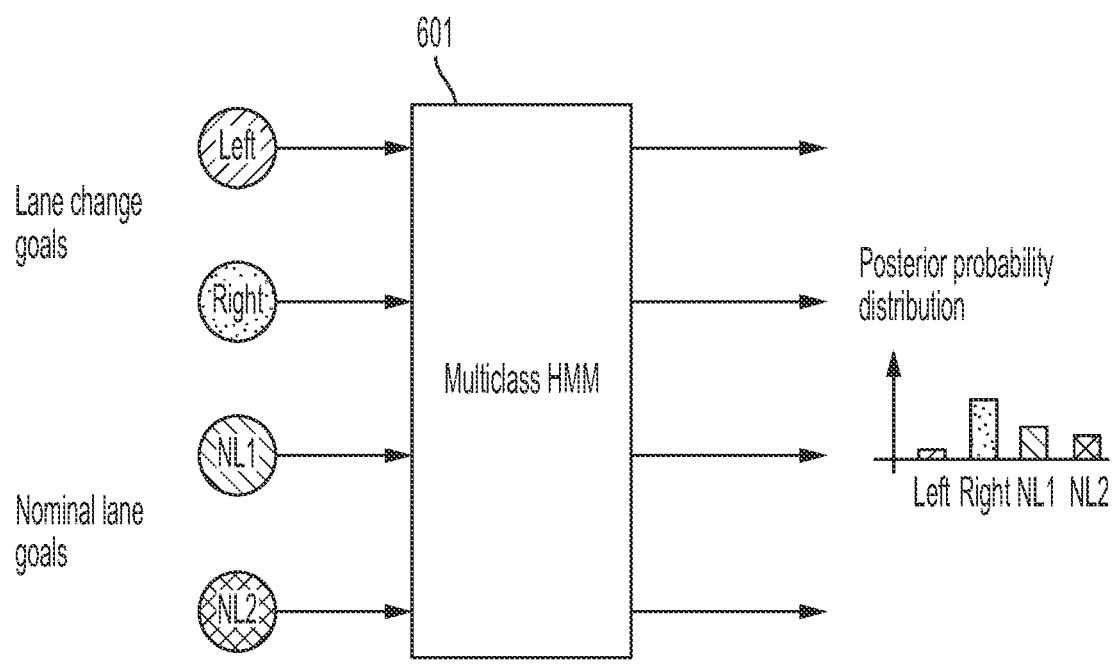
FIGS. 6A and 6B illustrate examples of how the system may use a probabilistic model to determine likelihoods of mutually exclusive goals.
Figure 6B:
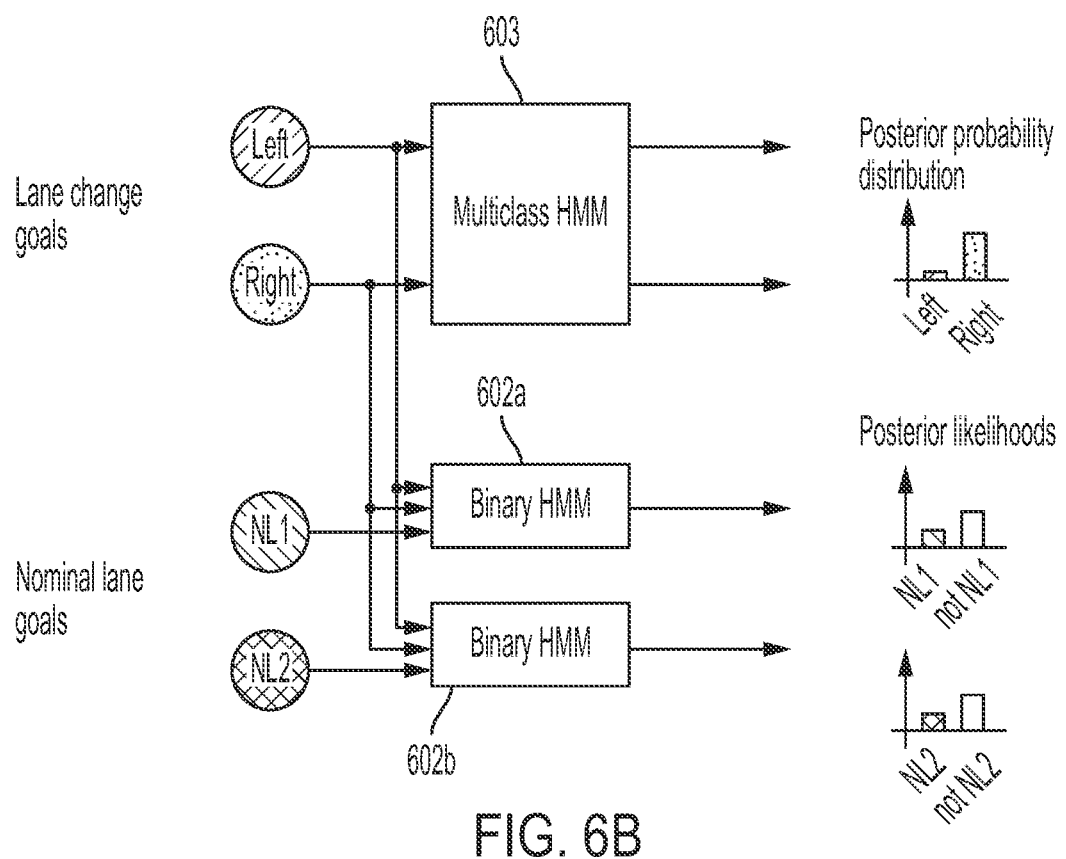

Some goals may be regarded as exclusive to each other over time, such a lane change goal and a nominal lane goal. In such situations it may make sense for the system to jointly track the likelihoods, using a multiclass HMM 601 as illustrated in FIG. 6A. Alternatively, the system may reason about and fit individual binary HMMs 602a, 602b with multiple sources of evidence, alone or in combination with a multiclass HMM 603 as illustrated in FIG. 6B.

Figure 7:
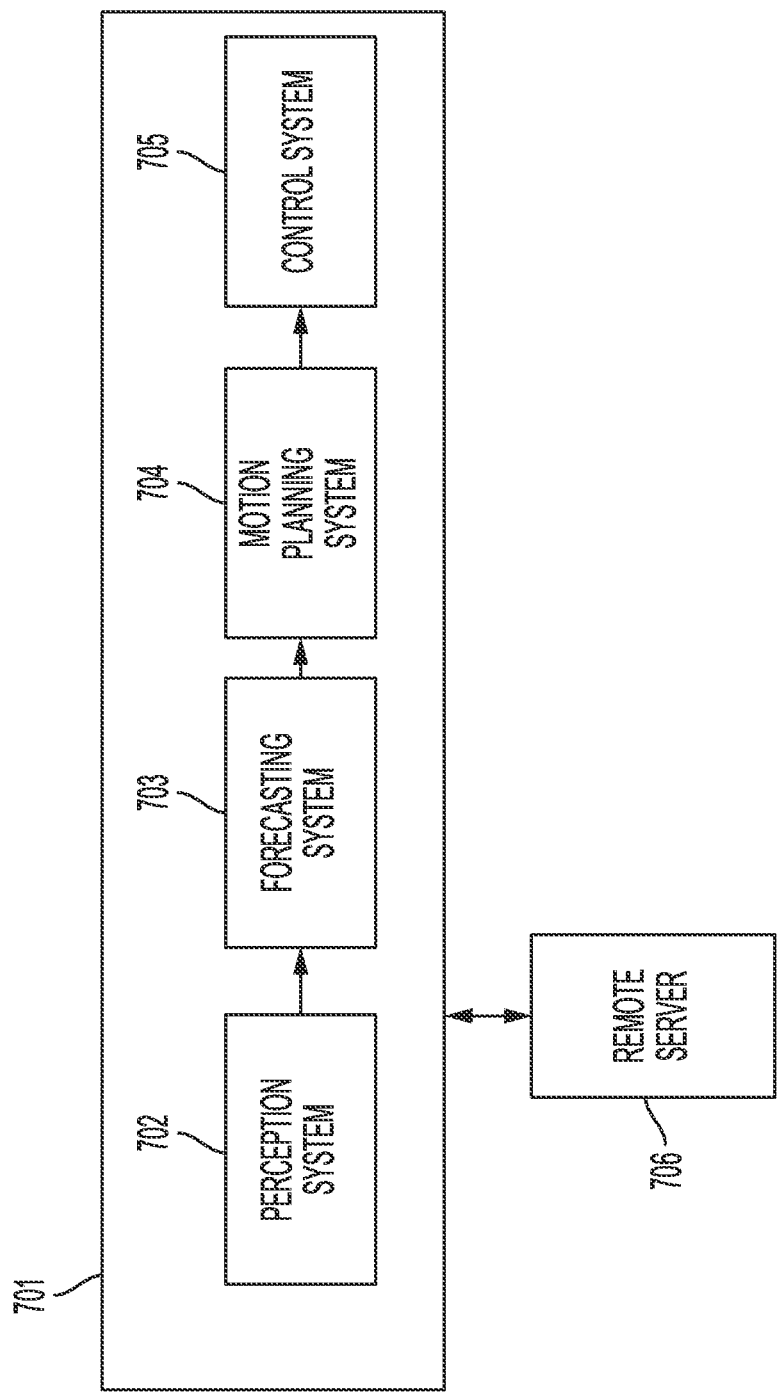
FIG. 7 is a block diagram illustrating various high-level systems of an autonomous vehicle.

FIG. 7 shows a high-level overview of AV subsystems that may be relevant to the discussion above. Specific components within such systems will be described in the discussion of FIG. 8 later in this document. Certain components of the subsystems may be embodied in processor hardware and computer-readable programming instructions that are part of the AV's on-board computing system 701. The subsystems may include a perception system 702 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

The vehicle's perception system 702 may deliver perception data to the vehicle's forecasting system 703. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 704 and control system 705 so that the receiving systems may assess such data and initiate any number of reactive motions to such data. The motion planning system 704 and control system 705 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

Figure 8:
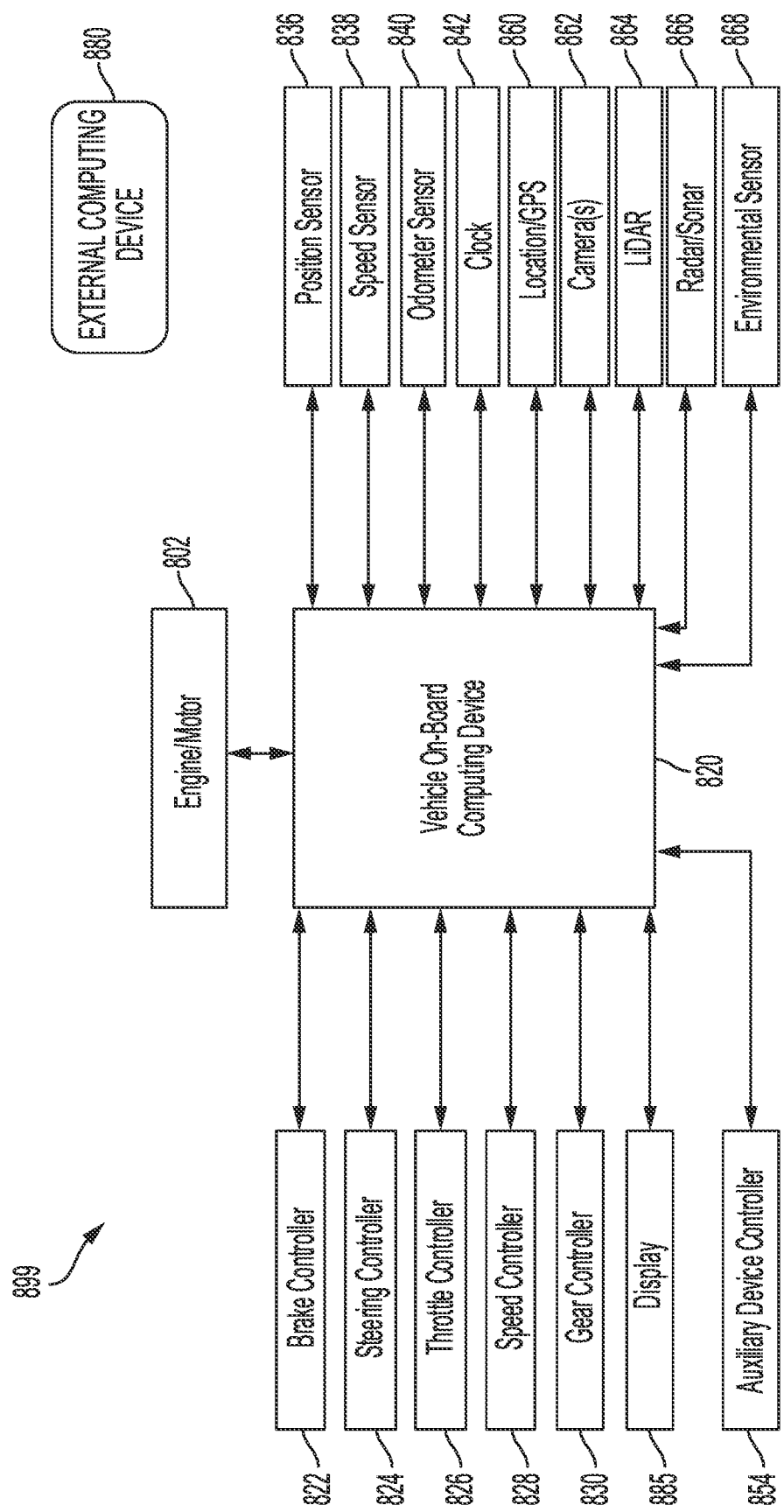
FIG. 8 illustrates examples of specific hardware that may make up the systems of FIG. 7.

FIG. 8 illustrates an example system architecture 899 for a vehicle, such as an AV. The vehicle includes an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 860 such as a global positioning system (GPS) device; object detection sensors such as one or more cameras 862; a LiDAR sensor system 864; and/or a radar and or and/or a sonar system 866. The sensors also may include environmental sensors 868 such as a precipitation sensor and/or ambient temperature sensor. The object detection sensors may enable the vehicle to detect moving actors and stationary objects that are within a given distance range of the vehicle 599 in any direction, while the environmental sensors collect data about environmental conditions within the vehicle's area of travel. The system will also include one or more cameras 862 for capturing images of the environment. Any or all of these sensors will capture sensor data that will enable one or more processors of the vehicle's on-board computing device 820 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication link, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 820. The on-board computing device 820 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 820 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors) to the on-board computing device 520. The object detection information and/or captured images may be processed by the on-board computing device 820 to detect objects in proximity to the vehicle 800. In addition or alternatively, the AV may transmit any of the data to an external computing device 880 for processing. Any known or to be known technique for performing object detection based on sensor data and/or captured images can be used in the embodiments disclosed in this document.

In addition, the AV may include an onboard display device 885 that may generate and output interface on which sensor data, vehicle status information, or outputs generated by the processes described in this document are displayed to an occupant of the vehicle. The display device may include, or a separate device may be, an audio speaker that presents such information in audio format.

Figure 9:
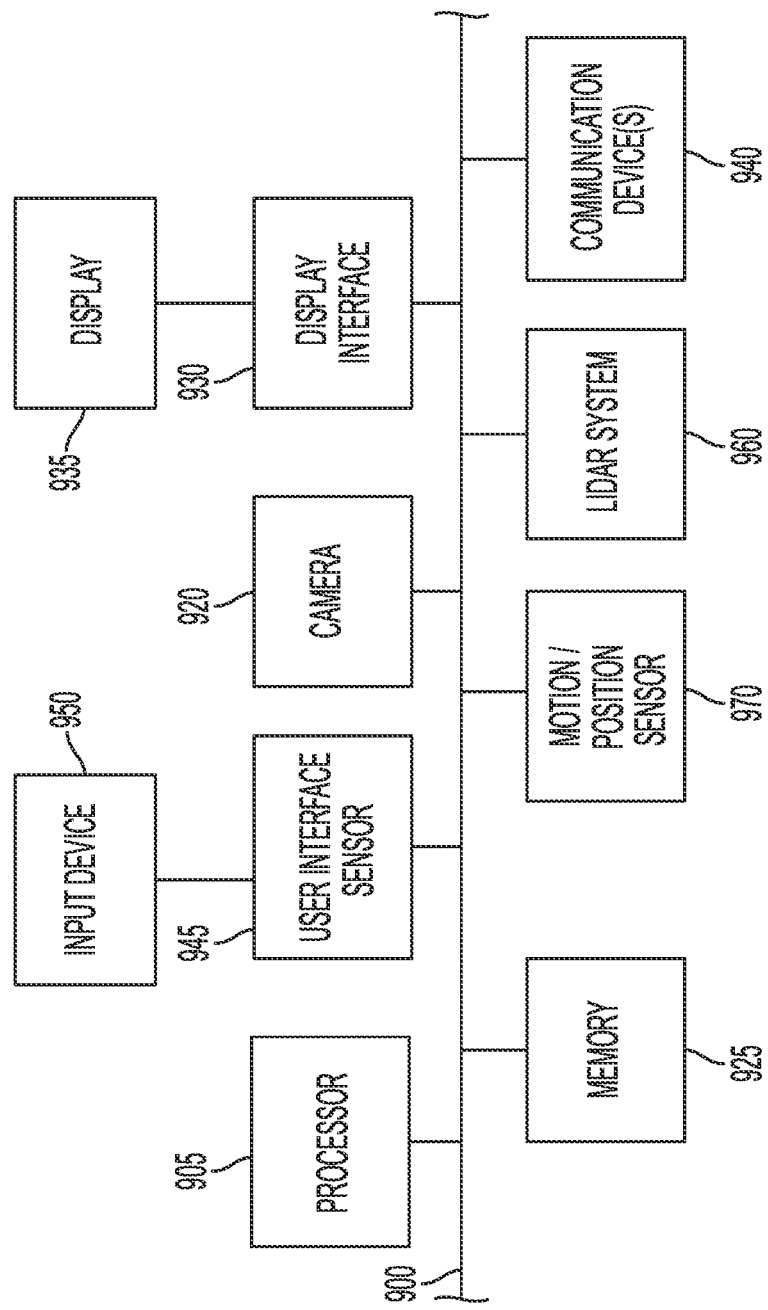
FIG. 9 is a block diagram that illustrates various elements of a possible electronic subsystem of an autonomous vehicle and/or external electronic device.

FIG. 9 depicts an example of internal hardware that may be included in any of the electronic components of the system, such as the onboard computing device of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may include and receive data via a LiDAR system 960, when used in the context of autonomous vehicles.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

In this document, when relative terms of order such as "first" and "second" are used to modify a noun, such use is simply intended to distinguish one item from another, and is not intended to require a sequential order unless specifically stated.

The invention claimed is:

1. A method of forecasting an intention of an actor in an environment through which an autonomous vehicle is traveling, the method comprising:
   by a perception system of an autonomous vehicle:
     detecting an actor that is proximate to the autonomous vehicle,
     determining a class of the actor, and
     detecting an action that the actor is taking;
   by a forecasting system of the autonomous vehicle for each cycle of a plurality of cycles:
     using the class and the detected action to generate a plurality of candidate intentions of the actor,
     evaluating a likelihood of each said candidate intention, and
     saving each of the candidate intentions and their likelihoods in a data store;
   after any current cycle of the plurality of cycles has completed, analyzing the candidate intentions and their likelihoods for the current cycle and for one or more of the prior cycles to determine an overall probability for each candidate intention of the candidate intentions based on at least a persistence of the candidate intention over a non-interrupted sequence of cycles, where each said cycle represents a time period over which the actor was sensed by the perception system; and
   by a motion planning system of the autonomous vehicle;
     using the overall probabilities to select at least one candidate intention of the candidate intentions,
     forecasting a subsequent future intention that the actor may have after reaching a goal defined by the selected at least one candidate intention,
     obtaining an actor trajectory that is consistent with the selected at least one candidate intention and the subsequent future intention, and
     using the actor trajectory to influence a selected trajectory for the autonomous vehicle.

2. The method of claim 1, wherein using the class and the detected action to generate a plurality of candidate intentions of the actor comprises:
   accessing a data set of possible goals that are associated with various classes of actors;
   selecting possible goals that the data set associates with the detected class of the actor;
   determining which of the possible goals in the data set are consistent with the detected action; and
   using the determined possible goals as the candidate intentions.

3. The method of claim 2, wherein determining which of the possible goals in the data set are consistent with the detected action comprises:
   determining whether the detected action satisfies one or more rules of each of the possible goals; or
   processing the detected actions and possible goals in a machine learning model that has been trained on a data set of labeled actions and goals.

4. The method of claim 2, wherein determining the overall probabilities for the candidate intentions comprises:
   identifying a first goal of the candidate intentions and a second goal of the candidate intentions, wherein the first goal conflicts with the second goal; and
   determining that the detected actions of the actor over a plurality of cycles were consistent with the first goal, and in response reducing the overall probability of the candidate intention that is the second goal.

5. The method of claim 1, wherein evaluating the likelihood of each candidate intention comprises tracking each candidate intention with a unique probabilistic model per candidate intention, in which [false, true] states of each probabilistic model represent whether the candidate intention corresponds to detected action.

6. The method of claim 1, further comprising, after an additional group of cycles have been completed, wherein the additional group comprises at least some of the cycles considered when determining the overall probabilities plus one or more additional cycles:
   analyzing the candidate intentions and their likelihoods for the additional group of cycles to refine the overall probabilities for each of the candidate intentions.

7. The method of claim 1, further comprising:
   assigning a probability to the forecasted subsequent future intention;
   wherein the actor trajectory is obtained using the forecasted future intention when the probability exceeds a threshold.

8. The method of claim 7, further comprising, before forecasting the subsequent future intention of the actor:
   eliminating candidate intentions having likelihoods that are below a threshold, so that forecasting the future subsequent intention of the actor is only performed for the at least one candidate intention which has a relatively high likelihood.

9. The method of claim 1, wherein determining the overall probabilities for each of the candidate intentions comprises:
assigning a relatively higher likelihood to any candidate intention that persisted over a non-interrupted sequence of cycles; and
assigning a relatively lower likelihood to any candidate intention that did not persist over a non-interrupted sequence of cycles.

10. The method of claim 1, wherein determining the overall probabilities for each of the candidate intentions comprises:
evaluating each of the candidate intentions against a kinematic state of the actor;
assigning a relatively higher likelihood to any candidate intention that is consistent with the kinematic state of the actor; and
assigning a relatively lower likelihood to any candidate intention that is not consistent with the kinematic state of the actor.

11. The method of claim 1, wherein determining the overall probabilities for the candidate intentions comprises:
receiving, from a plurality of sensors of the perception system, environmental data relating to the environment through which the autonomous vehicle is traveling;
applying the environmental data to a random forest classifier to classify an environmental condition of the environment;
assigning a relatively higher likelihood to any candidate intention that is consistent with the environmental condition; and
assigning a relatively lower likelihood to any candidate intention that is not consistent with the environmental condition.

12. An autonomous vehicle, comprising:
a perception system comprising:
one or more sensors for capturing perception data about actors that are proximate to the autonomous vehicle,
a processor, and
a memory with programming instructions configured to instruct the processor of the perception system to process the perception data to:
detect and classify an actor that is proximate to the autonomous vehicle, and
detect an action that the actor is taking;
a forecasting system comprising:
a processor, and
a memory with programming instructions configured to cause the processor of the forecasting system to:
for each cycle of a plurality of cycles:
use the class and the detected action to generate a plurality of candidate intentions of the actor;
evaluate a likelihood of each candidate intention; and
save each of the candidate intentions and their likelihoods in a data store,
after any current cycle of the plurality of cycles has completed, analyze the candidate intentions and their likelihoods for the current cycle and for one or more of the prior cycles to determine an overall probability for each intention of the candidate intentions based on at least a persistence of the intention over a non-interrupted sequence of cycles, where each said cycle represents a time period over which the actor was sensed by the perception system; and
a motion planning system comprising:
a processor, and
a memory with programming instructions configured to cause the processor of the motion planning system to:
use the overall probabilities to select at least one candidate intention of the candidate intentions,
forecast a subsequent future intention that the actor may have after reaching a goal defined by the selected at least one candidate intention,
obtain an actor trajectory that is consistent with the selected at least one candidate intention and the subsequent future intention, and
use the actor trajectory to influence a selected trajectory for the autonomous vehicle.

13. The autonomous vehicle of claim 12, wherein the instructions to use the class and the detected action to generate a plurality of candidate intentions of the actor comprise instructions to:
access a data set of possible goals that are associated with various classes of actors;
select possible goals that the data set associates with the detected class of the actor;
determine which of the possible goals in the data set are consistent with the detected action; and
use the determined possible goals as the candidate intentions.

14. The autonomous vehicle of claim 13, wherein the instructions to determine which of the possible goals in the data set are consistent with the detected action comprise instructions to:
determine whether the detected action satisfies one or more rules of each of the possible goals; or
process the detected actions and possible goals in a machine learning model that has been trained on a data set of labeled actions and goals.

15. The autonomous vehicle of claim 12, wherein the instructions to evaluate the likelihood of each candidate intention comprise instructions to track each candidate intention with a unique probabilistic model per candidate intention, in which [false, true] states of each probabilistic model represent whether the candidate intention corresponds to detected action.

16. The autonomous vehicle of claim 12, further comprising additional programming instructions configured to instruct the processor of the forecasting system to, after an additional group of cycles have been completed, wherein the additional group comprises at least some of the cycles considered when determining the overall probabilities plus one or more additional cycles:
analyze the candidate intentions and their likelihoods for the additional group of cycles to refine the overall probabilities for each of the candidate intentions.

17. The autonomous vehicle of claim 12, further comprising additional programming instructions that are configured to cause the processor of the forecasting system to, for at least some of the candidate intentions, assign a probability to the forecasted subsequent future intention;
wherein the actor trajectory is obtained using the forecasted subsequent future intention when the probability exceeds a threshold.

18. The autonomous vehicle of claim 12, further comprising additional programming instructions that are configured to cause the processor of the forecasting system to, before forecasting the subsequent future intention of the actor:

eliminate candidate intentions having likelihoods that are below a threshold, so that forecasting the subsequent future intention of the actor is only performed for the at least one candidate intention which has a relatively high likelihood.

19. The autonomous vehicle of claim 12, wherein the instructions to determine the overall probabilities for each of the candidate intentions comprise instructions to:

assign a relatively higher likelihood to any candidate intention that persisted over a non-interrupted sequence of cycles; and assign a relatively lower likelihood to any candidate intention that did not persist over a non-interrupted sequence of cycles.

20. The autonomous vehicle of claim 12, wherein the instructions to determine the overall probabilities for each of the candidate intentions comprise instructions to:

evaluate each of the candidate intentions against a kinematic state of the actor;

assign a relatively higher likelihood to any candidate intention that is consistent with the kinematic state of the actor; and assign a relatively lower likelihood to any candidate intention that is not consistent with the kinematic state of the actor.

21. The autonomous vehicle of claim 12, wherein the instructions to determine the overall probabilities for each of the candidate intentions comprise instructions to:

receive, from one or more of the sensors of the perception system, environmental data relating to the environment through which the autonomous vehicle is traveling;

apply the environmental data to a random forest classifier to classify an environmental condition of the environment;

assign a relatively higher likelihood to any candidate intention that is consistent with the environmental condition; and assign a relatively lower likelihood to any candidate intention that is not consistent with the environmental condition.

22. The autonomous vehicle of claim 12, wherein the instructions to determine the overall probabilities for each of the candidate intentions comprise instructions to:

identify a first goal of the candidate intentions and a second goal of the candidate intentions, wherein the first goal conflicts with the second goal; and determine that the detected actions of the actor over a plurality of cycles were consistent with the first goal, and in response reduce the overall probability of the candidate intention that is the second goal.

23. A non-transitory computer-readable medium that stores instructions that are configured to, when executed by at least one computing device, cause the at least one computing device to perform operations comprising:

detecting an actor that is proximate to the autonomous vehicle, determining a class of the actor, and detecting an action that the actor is taking;

for each cycle of a plurality of cycles:
using the class and the detected action to generate a plurality of candidate intentions of the actor,
evaluating a likelihood of each candidate intention, and
saving each of the candidate intentions and their likelihoods in a data store;

after any current cycle of the plurality of cycles has completed, analyzing the candidate intentions and their likelihoods for the current cycle and for one or more of the prior cycles to determine an overall probability for each intention of the candidate intentions based on at least a persistence of the intention over a non-interrupted sequence of cycles, where each said cycle represents a time period over which the actor was sensed by the perception system; and using the overall probabilities to select at least one candidate intention of the candidate intentions, forecasting a subsequent future intention that the actor may have after reaching a goal defined by the selected at least one candidate intention, obtaining an actor trajectory that is consistent with the selected at least one candidate intention and the subsequent future intention, and using the actor trajectory to influence a selected trajectory for the autonomous vehicle.

* * * * *